(12) United States Patent
Adamietz et al.

(10) Patent No.: US 6,927,385 B2
(45) Date of Patent: Aug. 9, 2005

(54) OPTICAL SENSOR AND METHOD OF SUPPRESSING INTERFERENCE LIGHT THEREFOR

(75) Inventors: Hubert Adamietz, Ostfildern (DE); Yasunobu Sakai, Nufringen (DE); Martin Schurer, Nufringen (DE); Folke Ojemann, Ostfildern (DE); Jochen Betz, Tübingen (DE); Gerold Stauss, Herrenberg (DE)

(73) Assignee: Omron Corporation, Kyoto (JP)

( * ) Notice: Subject to any disclaimer, the term of this patent is extended or adjusted under 35 U.S.C. 154(b) by 83 days.

(21) Appl. No.: 10/109,567

(22) Filed: Mar. 27, 2002

(65) Prior Publication Data

US 2002/0167706 A1 Nov. 14, 2002

(30) Foreign Application Priority Data

Apr. 2, 2001 (DE) .......................................... 101 17 838

(51) Int. Cl.$^7$ ............................................... H01J 40/14
(52) U.S. Cl. .................. 250/221; 250/214 B; 398/158; 398/172; 340/556
(58) Field of Search ............................... 398/106, 140, 398/158, 159, 161, 172, 194; 348/734; 250/214 R, 221, 214 B; 359/264; 340/555–557; 375/239; 370/213

(56) References Cited

U.S. PATENT DOCUMENTS

| | | | |
|---|---|---|---|
| 3,097,340 A | | 7/1963 | Dobbie ........................ 327/114 |
| 3,676,699 A | | 7/1972 | Warren ......................... 327/34 |
| 3,866,177 A | * | 2/1975 | Kawamata et al. .......... 398/106 |
| 4,095,125 A | | 6/1978 | Ingle ............................ 327/31 |
| 4,724,312 A | * | 2/1988 | Snaper .................... 250/214 R |
| 5,103,085 A | * | 4/1992 | Zimmerman ................. 250/221 |
| 5,532,472 A | * | 7/1996 | Furuta ..................... 250/214 B |
| 5,574,585 A | * | 11/1996 | Thaler et al. ................ 398/106 |
| 5,801,376 A | | 9/1998 | Haberl et al. ................ 250/221 |
| 5,901,376 A | * | 5/1999 | Deirmendjian et al. ......... 2/114 |
| 5,933,040 A | * | 8/1999 | Rokhsaz et al. ............. 327/306 |
| 6,169,765 B1 | * | 1/2001 | Holcombe ................... 375/238 |
| 6,396,060 B1 | * | 5/2002 | Ramsey ....................... 250/351 |

FOREIGN PATENT DOCUMENTS

| | | |
|---|---|---|
| DE | 3125728 A1 | 2/1982 |
| DE | 3435097 A1 | 4/1985 |
| DE | 3823007 A1 | 1/1990 |
| DE | 4015912 A1 | 1/1991 |
| DE | 19613940 A1 | 10/1997 |
| DE | 19848949 A1 | 5/1999 |
| DE | 19924351 A1 | 12/1999 |

* cited by examiner

*Primary Examiner*—Thanh X. Luu
*Assistant Examiner*—Stephen Yam
(74) *Attorney, Agent, or Firm*—Beyer Weaver & Thomas LLP

(57) ABSTRACT

An optical sensor includes a light transmitter for transmitting pulsed light signals and a light receiver for receiving them. In order to suppress the effects of interfering noise light, the light signals are transmitted according to a specified pattern including pulses in packages separated from each other by a specified interval, the pulses within each of the packages following one another with a specified carrier frequency. Groups each including two or more such pulse packages may be employed. The light receiver converts a received light signal into an electrical signal and directly thereafter passes the electrical signal through a bandpass filter with a pass band including this carrier frequency. The light receiver may normalize received electrical pulses by suppressing those which are too low or narrow and uniformizing the width of those not suppressed, expand the pulses with the uniformized widths to improve accuracy of evaluation, integrate the expanded pulses and examine whether the integrated signal exceeds a specified threshold value.

16 Claims, 3 Drawing Sheets

OPTICAL SENSOR AND METHOD OF SUPPRESSING INTERFERENCE LIGHT THEREFOR

BACKGROUND OF THE INVENTION

This invention relates to an optical sensor having a light transmitter for transmitting pulsed light and a light receiver for receiving light and determining whether the received light was from the light transmitter, as well as a method of suppressing effects of interference light on the light received. More particularly, this invention relates to such an optical sensor and such a method wherein the pulsed light is transmitted according to a specified pattern including a pair of pulse packages separated by a specified time interval and each including a plurality of pulses following one another at a specified carrier frequency.

International patent publication WO 96/38742 disclosed a device for eliminating interference (noise) signals in a light barrier, comprising a comparator for filtering out noise signals with small amplitudes. A transmitter transmits periodic light pulses with a specified frequency and the same frequency is also set for the light receiver. The light receiver is activated in synchronism with the transmitted light signal. A period of pause after each activation period is adjusted to be equal to the interval between a pair of successive pulses transmitted.

German patent publication DE 42 24 784 C2 disclosed a method of eliminating the effects of noise light in a light barrier. The groups of coded light pulses are transmitted through a time window which is smaller than an expected minimum interval between noise pulses (say, from a fluorescent lamp). Even with a noise pulse superposed, a noise-free pulse group will always be received by the receiver, and it is sufficient to conclude that the transmitted light has been received.

German patent publication DE 31 19 876 A1 disclosed an infra-red transmission/reception system, say, for a light barrier arrangement, providing for multiple coding of transmitted signals, for example, by modulating a pulse-coded signal with a carrier frequency. Multiple coding permits several light barrier arrangements to be operated concurrently if each arrangement uses a different coding. The carrier frequency used was 31.25 kHz.

Modem fluorescent lamps generate modulated light with high frequencies with basic frequency of about 100 kHz in the case of a so-called energy-saving type. With a linearly elongated type of fluorescent tube, light from the center portion of the tube is modulated with basic frequency of 60–80 kHz and it is about 30–40 kHz at the end parts of the tube. Steep edges entail high harmonic components due to which even higher frequencies are generated.

With increasing popularity of fluorescent lamps, there is an increased problem of interference on conventional optical sensors. For optical sensors with a light transmitter and a light receiver which are separated, or light barriers, suppression of noise (interference) light is a critically important problem.

SUMMARY OF THE INVENTION

It is therefore an object of this invention to improve suppression of noise (interference) light in an optical sensor and particularly noise light from a fluorescent lamp of the so-called energy saving type.

In view of this general object, a method according to this invention may be characterized not only as having a light transmitter for transmitting pulsed light according to a specified pulse pattern and a light receiver adapted to receive emitted light from the light transmitter but also wherein the received light signal is converted into an electrical signal and is directly and selectively passed through a bandpass filter with a pass band in the range of the carrier frequency for generating the transmitted light signal.

According to a preferred embodiment, the pulse pattern includes what are herein referred to as pulse packages with a carrier frequency, each including several light pulses transmitted successively. The separation between two successive pulse packages is adjusted to the measuring distance of the optical sensor (say, the distance of separation between the light transmitter and the light receiver). Thus, a so-called double modulation takes place such that there is no ambiguity which is likely to result within the range of measurement. The carrier frequency is selected high enough for eliminating effects of noise light. If the carrier frequency is 2 MHz, the duration of each pulse and the intervals therebetween may be about 250 ns.

With bandpass filtering immediately after the light signal is received and converted into an electrical signal, immunity from interfering noise light is substantially increased. Incorporation of an amplifier and a bandpass filter prevents saturation of the input amplifier by noise light.

The light transmitter may be adapted to transmit a group of two or more pulse packages at a specified time interval, or two or more such groups separated still another specified time interval, to be used as one or more of criteria for the optical sensor to determine whether or not the received light signal was purely due to noise or a result of light transmission from its light transmitter. The total duration of time for these groups of pulse packages to be emitted is preferably shorter than a minimum distance for the case of anticipated noise light pulses. It may be decided that light signal from the light transmitter has been received on the condition that at least two pulse packages with the specified interval in between have been received.

With this "double-package criterion", the distinction between noise and light transmitted from the light transmitter can be made more reliably. Noise signals received between these two packages and outside of them are not important and may be blocked.

If a noise signal falls directly on the pulse package, the pulse package can still be recognized as one due to the signals from the light transmitter, or "valid". The pulse packages have a carrier frequency, comprising several pulses. Thus, only the noise pulses, and not the pulse packages, are filtered out by the bandpass filter. In other words, the criterion for a valid reception is not the entire transmission of the pulses but only the presence of two pulse packages at the right times.

According to one embodiment of the invention, signal pulses generated by the light receiver are passed through a comparator with a threshold, cutting off pulses less than the threshold and normalizing the passed pulses to a predetermined height. A signal normalization of this type serves to eliminate the disturbing effects of very short and high-energy flashes. Then, light signals with duration less than a predetermined limit value are suppressed, based on the idea that very narrow signals cannot be a part of the useful signal from the light transmitter. The limit value may be adjusted, depending upon the width of the light pulse.

A pulse width comparator may be used according to this invention to output a pulse of a uniform width in response to the input of a pulse with width greater than a predetermined standard width. In this manner, the evaluation of received pulse package depends only on the number of received pulses, not on their duration. This is advantageous because pulses of constant duration are transmitted and hence transmission distortions and interference from additional external pulses can be eliminated.

There may also be provided a pulse expander to increase the uniform width of the signal pulses from the pulse width comparator by a predetermined uniform amount. The broadened pulses are then passed through an integrator over a predetermined period of time and the integrated result is compared with a threshold value by a comparator. Individual noise pulses can no longer influence the result of the integration because they do not reach the threshold adjusted to a pulse package. The result of the evaluation by the use of such a threshold corresponds to the evaluation of a pulse package.

The pulses outputted from the pulse width comparator are relatively narrow. After these narrow pulses pass through the pulse expander, there result uniform pulses with a constant and relatively long duration. Thus, the threshold of the comparator disposed downstream to the integrator can be raised, and the raised operating threshold can achieve a good signal-to-noise ratio, making the validity evaluation by the comparator more stable.

After the reception of a valid signal, that is, after the light receiver has received pulse packages or groups of pulse packages and evaluated that they were valid signals corresponding to light transmitted from the light transmitter, the passage of signals through the light receiver may be blocked for a certain length of time specified according to the distance between the pulse packages or between the groups of pulse packages. Such blocking may be effected in synchronism with the light transmission from the light transmitter. No line connection is necessarily required between the light transmitter and the light receiver for this purpose.

An optical sensor embodying this invention is generally characterized as using any of the methods described above for suppressing effects of interference light. It includes a light transmitter for transmitting pulsed light signals, having a modulator circuit for modulating the pulsed light signals with a carrier frequency, and a light receiver for receiving the pulsed light signals from the light transmitter, including a photoelectric converting element for converting a received light signal into an electrical signal and a bandpass circuit disposed immediately downstream to the photoelectric converting element wherein the bandpass circuit has a bandpass range including the carrier frequency. The photoelectric converting element may be directly a part of the bandpass filter. An amplifier with bandpass property of a bandpass filter may be conveniently formed with passive components and transistors. The light receiver may include a pulse width comparator for suppressing pulses of received signal which are not wider than a specified standard width. The light receiver may also include a resonance circuit having a resonance frequency which is at the middle of the bandpass range of the bandpass circuit. With such a resonance circuit, saturation of the amplifier by noise light can be effectively prevented. A resonance circuit of this type may be provided by inserting an inductor between the photoelectric converting element and the ground.

BRIEF DESCRIPTION OF THE DRAWINGS

FIGS. 3-1, 3-2, 3-3, 3-4, 3-5, 3-6 and 3-7, together referred to as FIG. 3, are waveform diagrams of signals received and processed within the light receiver of FIG. 1.

DETAILED DESCRIPTION OF THE INVENTION

Figure 1:
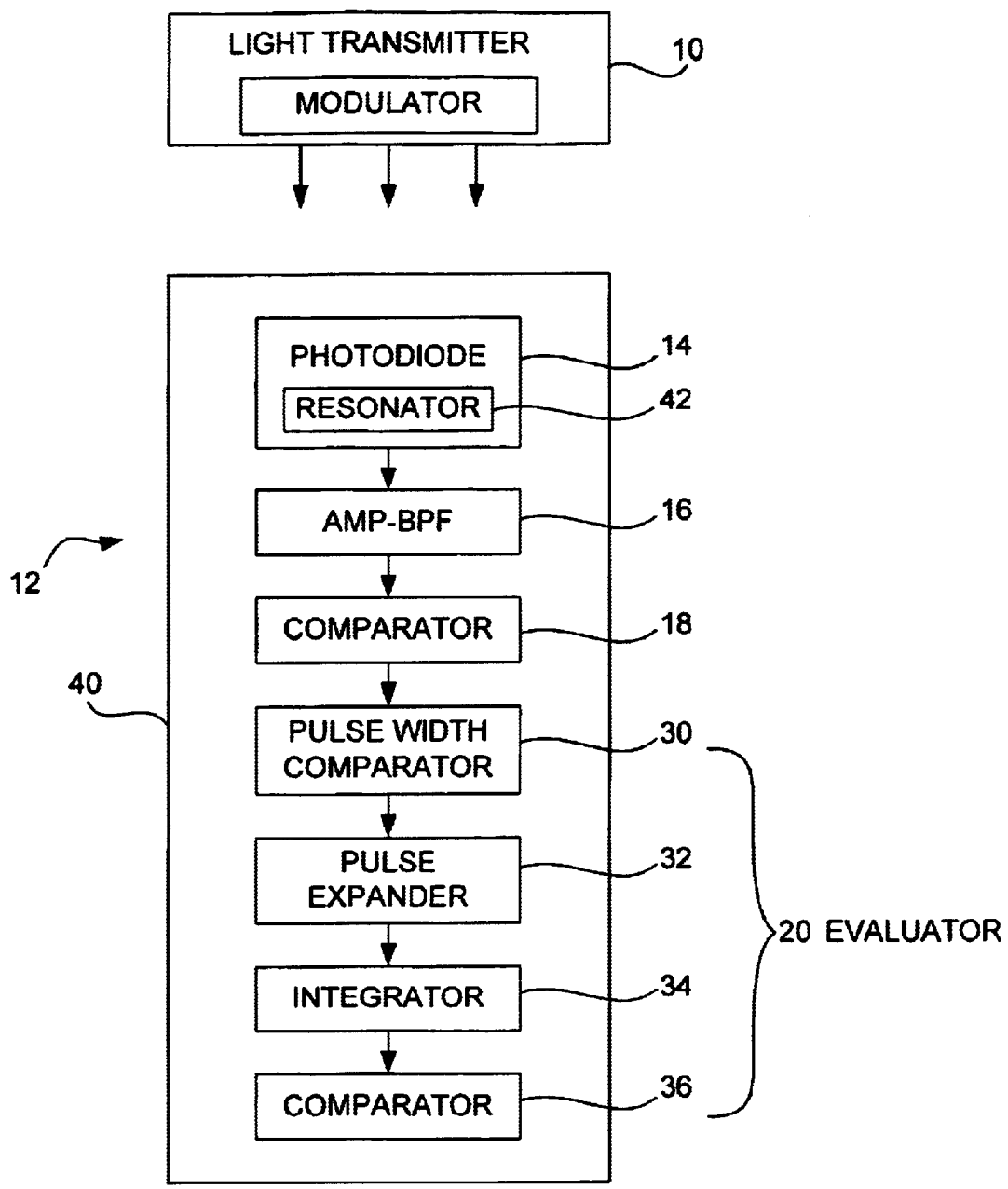
FIG. 1 is a schematic block diagram of an optical sensor embodying this invention.

FIG. 1 shows schematically an optical sensor embodying this invention, comprising a light transmitter 10 for transmitting light signals and a light receiver 12, having a modulator circuit 11 for modulating the pulsed light signals with a carrier frequency. A light signal transmitted from 10, upon being received by the light receiver 12, is converted into an electrical signal by a photodiode 14 and is transmitted to an amplifier with bandpass properties (herein referred to as the "amplifier-bandpass filter" 16). The center frequency of this amplifier-bandpass filter 16 is 2 MHz (selected as being above the modulation frequencies of fluorescent lamps). One of the advantages of thus integrating the functions of an amplifier and an ordinary bandpass filter is that an ordinary amplifier may be saturated by noise light, and the possibility of such saturation can be prevented. If the noise light is of a sufficiently high intensity and near an edge of the sensitivity range of an optical device, there is a danger to be taken into consideration of having its input amplifier saturated.

The signal outputted from the amplifier-bandpass filter 16 is received by a comparator 18 by which disturbing effects from high-energy flashes are eliminated and the signal is digitized. The signal outputted from this comparator 18 is received by an evaluator 20, to be described more in detail below.

Figure 2:
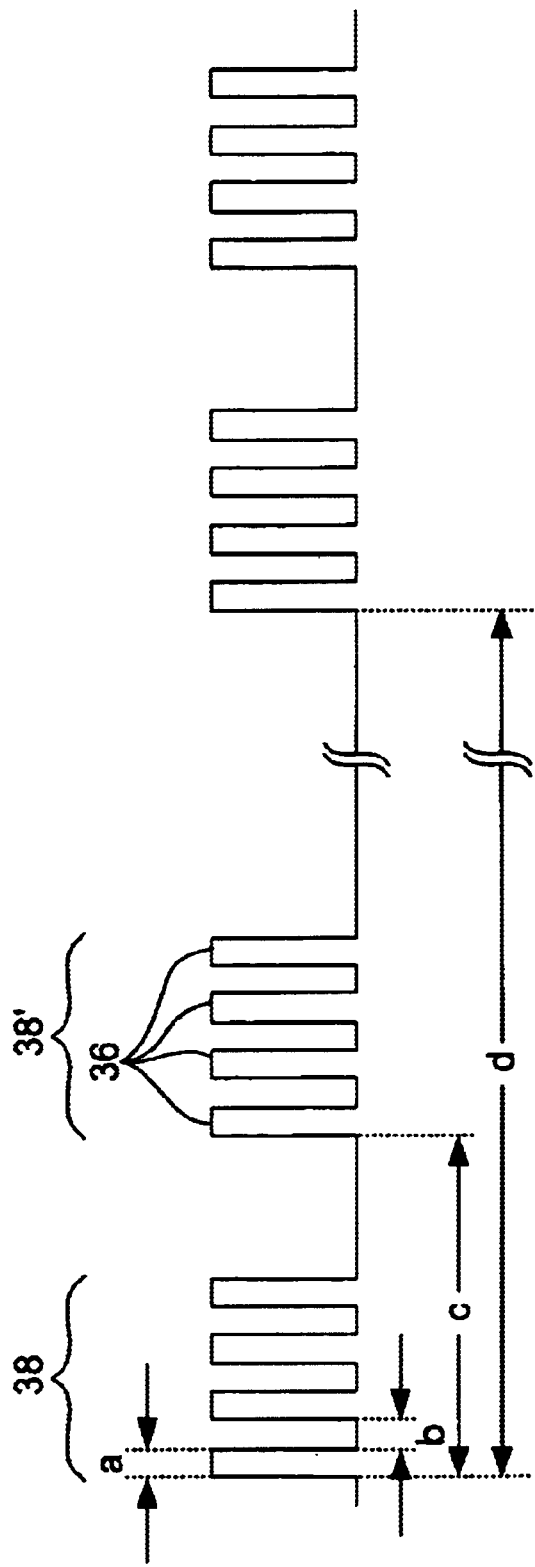
FIG. 2 is a pulse diagram of the light signal transmitted from the light transmitter of FIG. 1.

FIG. 2 is a pulse diagram of the light signal transmitted from the light transmitter 10. As shown, several (four in the example shown) light pulses 36 of same height are transmitted successively as a pulse package 38 with a carrier frequency of 2 MHz, the duration of each pulse 36 (shown as "a") and the intervals therebetween (shown as "b") are both 250 ns. After a specified time interval shown by "c" (=10 μs from the time of emission of the first pulse package 38), another pulse package 3' with the identical waveform is transmitted. After another specified time interval shown by "d" (=100 μs also from the time of emission of the first pulse package 38), another pair of pulse packages 38 and 38' is transmitted with the same specified time interval therebetween. The carrier frequency of 2 MHz is sufficiently high in view of the modulation frequencies of noise light, say, from a fluorescent lamp of an energy-saving type. Thus, a simple bandpass filter may be used sufficiently for the suppression of noise light.

Figures 1, 3:
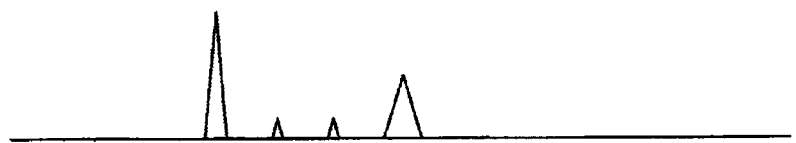
Figures 2, 3:
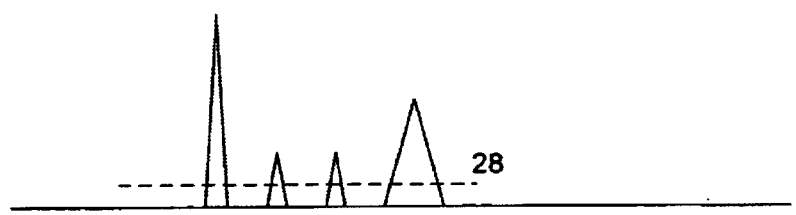
Figure 3:

FIGS. 1 and 3 are referenced next together to explain more in detail the functions of various components of the light receiver 12 both explained above and yet to be described, contained within a common housing 40. In FIG. 1, numeral 42 symbolically represents a resonance circuit referenced above.

As a pulse package as shown at 38 in FIG. 2 is received by the light receiver 12 in an environment with the presence of noise light, the output from the photodiode 14 may be as shown in FIG. 3-1, the uniformly shaped pulses 36 resulting in unequal electrical pulses due to the noise. After these electrical pulses are passed through the amplifier-bandpass filter 16, their waveform may become as shown in FIG. 3-2 wherein numeral 28 indicates the threshold level of the comparator 18. After passing through this comparator 18, the signal may appear as shown in FIG. 3-3, including pulses with different widths.

The evaluator 20 includes a pulse width comparator 30 and a pulse expander 32, as shown in FIG. 1. The signal outputted from the comparator 18 with waveform shown in FIG. 3-3 is first passed through the pulse width comparator 30 which serves to suppress any of inputted pulses with a width less than a specified standard value. This is based on the idea that it is not likely that very narrow pulses with widths smaller than such a specified standard value were in response to the light received from the light transmitter 10 and hence to be ignored by the sensor, although very wide pulse should not be simple-mindedly ignored because they may very well have resulted when a noise pulse was superposed to one of the pulses 36 in the received pulse package 38.

Figures 3, 4:

The pulse width comparator 30 also serves to output pulses with a uniform standard width in response to the individually inputted pulses each with a width greater than the aforementioned specified standard width. Thus, the output from the pulse width comparator 30 may be as shown in FIG. 3-4. For this example, FIG. 3-4 shows that the first of the four inputted pulses has been thereby suppressed, resulting in three pulses with equal widths. In other words, the evaluation of the pulse package received by the light receiver 12 according to this invention is effected by the evaluator 20 in terms of the number of the received pulses, not of their widths.

Figures 3, 4, 5:
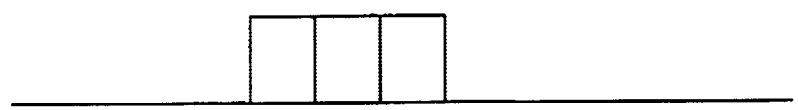
Figures 3, 4, 5, 6:
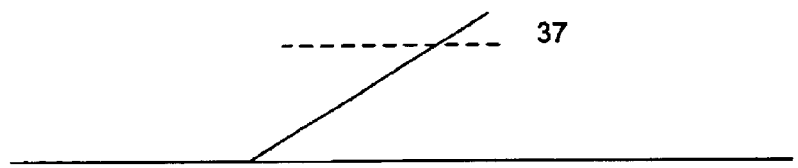
Figures 3, 4, 5, 6, 7:
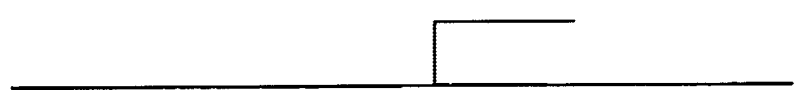

The pulses outputted from the pulse width comparator 30 are transmitted successively through a pulse expander 32, an integrator 34 and another comparator 36, as shown in FIG. 1. The pulse expander 32 serves to increase the width of the received pulses, as shown in FIG. 3-5, such that the signals outputted from the integrator 34 will be higher, hence that a higher signal-to-noise ratio will be achieved and that a higher operating threshold 37 may be set for the comparator 36.

The output from the integrator 34 is a monotonically increasing signal as shown in FIG. 3-6 and is compared by the comparator 36 with its threshold 37. In this example, since the output from the integrator 34 exceeds this threshold 37, the comparator 36 outputs a judgment signal as shown in FIG. 3-7, indicating that the pulse package received by the light receiver 12 and processed as explained above is to be regarded not purely as a result of noise but as representing a wave package originally transmitted from the light transmitter 10 with the waveform as shown in FIG. 2.

The invention has been described above by way of only one example but it is not intended to limit the scope of the invention. Many modifications and variations are possible within the scope of this invention. For example, although the time interval between two mutually adjoining wave packages (such as indicated by 38 and 38') was not utilized in the example above for determining whether or not the light emitted from the light transmitter 10 has been received by the light receiver 12, this time interval may also be used as one of criteria for the judgment by the evaluator 20. Similarly, more stringent criteria may be used for the judgment, including the receiving of two or more groups of pulse packages as shown in FIG. 2 (FIG. 2 showing two of such groups of two pulse packages each), separated by a specified time interval "d".

In summary all such modifications and variations are intended to be included within the scope of this invention.

What is claimed is:

1. A method of suppressing noise in an optical sensor having a light transmitter and a light receiver, said method comprising the steps of:

transmitting light from said light transmitter towards said light receiver according to a specified pattern, said pattern including pulses that are bunched in succesively transmitted packages, each of said packages including a plurality of said pulses, none of said pulses being transmitted between any two of said packages transmitted successively, said packages being separated from each other by a specified interval, the pulses within each of said packages following one another with a specified carrier frequency, said specified interval being adjusted according to measuring distance of said optical sensor and longer than the period of said specified carried frequency;

receiving a light signal by said light receiver;

converting said received light signal into an electrical signal; and directly thereafter passing said electrical signal through a bandpass filter adapted to selectively pass signals with said carrier frequency.

2. The method of claim 1 wherein said pattern includes a first group of at least two of said packages separated by said specified interval and a second group of at least two of said packages separated by said specified interval, said first group and said second group being separated by another specified interval, both said first group and said second group being transmitted within a total time period which is shorter than a specified minimum time interval determined by noise light expected to be present.

3. The method of claim 1 further comprising the step of integrating the electrical signals passed through said bandpass filter to thereby generate an integrated signal and comparing said integrated signal with a specified threshold value.

4. The method of claim 3 further comprising the step of normalizing the signal pulses generated by said light receiver, cutting off those of pulses below a specified limiting value and outputting pulses with a normalized height.

5. The method of claim 4 further comprising the step of suppressing those of the normalized pulses with a width not greater than a specified standard width.

6. The method of claim 5 further comprising the step of narrowing each of the normalized pulses with width greater than a specified standard width to a predetermined uniform width.

7. The method of claim 6 further comprising the step of expanding each of the narrowed pulses having said predetermined uniform width prior to being integrated.

8. The method of claim 1 further comprising the step of blocking passage of pulses through said light receiver for a predetermined length of time after said light receiver receives one or more of said pulse packages and evaluates that said received one or more pulse packages are valid signals corresponding to pulses transmitted from said light transmitter.

9. An optical sensor comprising:

a light transmitter for transmitting pulsed light signals in successively transmitted packages each including a plurality of pulses, none of said pulses being transmitted between any two of said packages transmitted successively, the pulses within each of said packages following one another with a specified carrier frequency, said successively transmitted packages being separated from each other by a specified interval that is adjusted according to measuring distance of said optical sensor and is longer than the period of said specified carrier frequency, said light transmitter having a modulator circuit for modulating said pulsed light signals with a carrier frequency; and a light receiver for receiving said pulsed light signals from said light transmitter, said light receiver having a photoelectric converting element for converting a received light signal into an electrical signal and a bandpass circuit disposed immediately downstream to said photoelectric converting element, said bandpass circuit having a bandpass range including said carrier frequency.

10. The optical sensor of claim 9 wherein said bandpass circuit is an amplifier with bandpass property of a bandpass filter.

11. The optical sensor of claim 9 wherein said light receiver includes a pulse width comparator for suppressing pulses of received signal which are not wider than a specified standard width.

12. The optical sensor of claim 10 wherein said light receiver includes a pulse width comparator for suppressing pulses of received signal which are not wider than a specified standard width.

13. The optical sensor of claim 9 wherein said light receiver includes a resonance circuit having a resonance frequency which is at the middle of said bandpass range of said bandpass circuit.

14. The optical sensor of claim 10 wherein said light receiver includes a resonance circuit having a resonance frequency which is at the middle of said bandpass range of said bandpass circuit.

15. The optical sensor of claim 11 wherein said light receiver includes a resonance circuit having a resonance frequency which is at the middle of said bandpass range of said bandpass circuit.

16. The optical sensor of claim 12 wherein said light receiver includes a resonance circuit having a resonance frequency which is at the middle of said bandpass range of said bandpass circuit.

* * * * *